(No Model.)
J. T. LAWRENCE.
OPTICAL TOY.
No. 568,260. Patented Sept. 22, 1896.
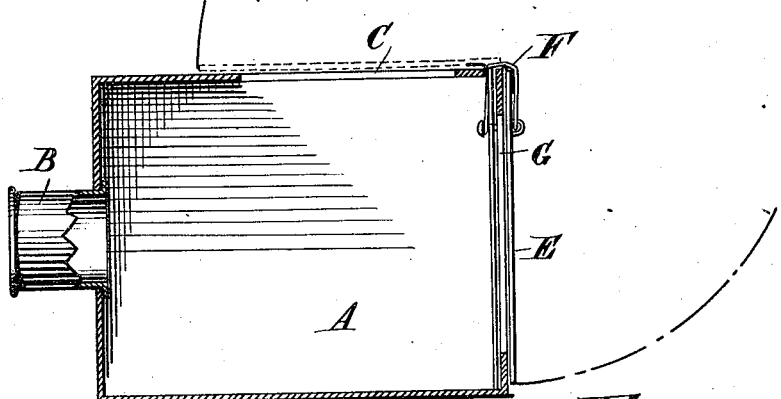
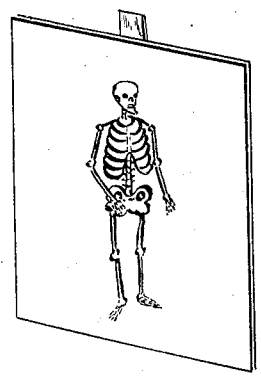
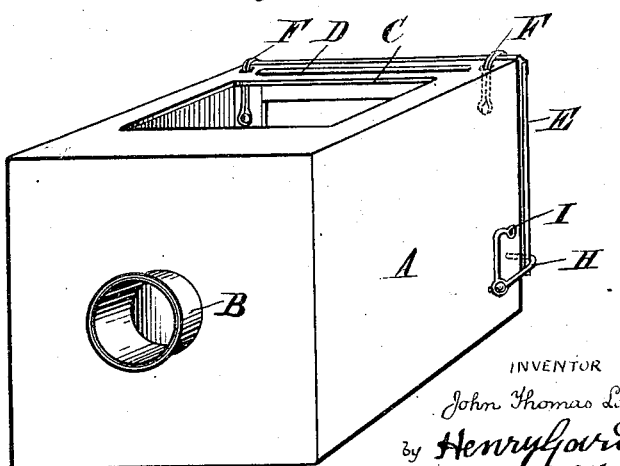
WITNESSES
Richard Coe Gardner
Charles A. Grosselek
INVENTOR
John Thomas Lawrence
by Henry Gardner
Atty (No Model.)  2 Sheets—Sheet 2.

J. T. LAWRENCE.
OPTICAL TOY.

No. 568,260. Patented Sept. 22, 1896.

WITNESSES
Richard Gore Gardner
Charles A. Drosselde

INVENTOR
John Thomas Lawrence
by Henry Gardner
Atty.

UNITED STATES PATENT OFFICE.

JOHN THOMAS LAWRENCE, OF LONDON, ENGLAND.

OPTICAL TOY.

SPECIFICATION forming part of Letters Patent No. 568,260, dated September 22, 1896.

Application filed April 20, 1896. Serial No. 588,360. (No model.) Patented in England February 22, 1896, No. 4,086.

*To all whom it may concern:*

Be it known that I, JOHN THOMAS LAWRENCE, a subject of the Queen of Great Britain, and a resident of West Bank, Stamford Hill, London, England, have invented certain new and useful Improvements in Optical Toys, (patented in Great Britain, No. 4,086, dated February 22, 1896,) of which the following is a specification.

This invention has for its object an apparatus or means for producing illusory changes of figure.

For the purpose of my said invention I construct in pasteboard or the like a box of camera shape with the back capable of falling or a top sliding back and a lens-aperture at front. If a back flap be pivoted, it is hinged at the upper part of the box and is in connection by an elastic thread to the body or upper front of the box, which thread is put in tension when the flap is folded down or drawn back, at which position it can be held by a wire or spring.

The usual field or object sheet in the back of the camera-box is of somewhat transparent paper or fabric with the appearance of a person or animal or device on one side and the representation of a skeleton of such a person or animal or other device on the other side directly behind and coincident therewith. If the flap be down or slid over the top opening, only the representation of a dressed figure will be seen if the lens-tube be looked through; but by releasing the catch the flap springs up or the slider springs back, whereby the box is darkened, when the transparency of the fabric will permit of the full figure of the skeleton to be seen, *a la* Roentgen photography pictures.

My invention is clearly shown on the annexed drawings.

Figure 5:
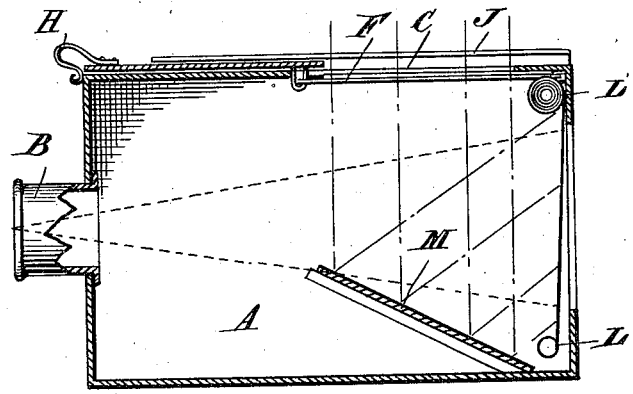
Figure 6:
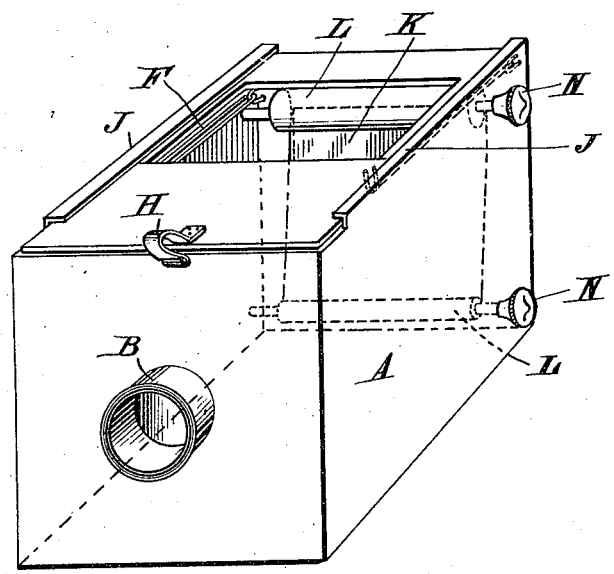

Figure 1 is a longitudinal section of box with transparent screen in position and having a spring over flap; Fig. 2, a perspective elevation of same; Fig. 3, a front view of transparent screen; Fig. 4, a back view of same; Fig. 5, a longitudinal section of box with transparent screen on rollers; Fig. 6, a perspective elevation of same.

Referring to Figs. 1 and 2, A is a box of square or rectangular shape; B, eye or sight aperture; C, opening at top back part of box; D, slit and guide lips into and down which transparent tablets, such as shown at Figs. 3 and 4, can be dropped; E, flap or back shutter; F, elastic bands or cords affixed to inside of box A and of flap E, these being put in tension by folding the flap downward to cover up the back opening G of box; H, crank-catch appliance to hold flap E in a downward position; I, handle of crank-catch, which when pushed forwardly forces crank-catch downwardly to release flap, which then springs over the top of box A and shuts up the top opening C.

Referring to the modification shown at Figs. 5 and 6, the shutter E slides in side grooves J J and is held back by curved catch H, the tongue of which when pushed upward releases shutter to slide back under tension of elastic bands or cords F to close top opening C.

The transparent body K is here shown on rollers L for change of figure-views, the general picture being enhanced to vision by reflector M, if desired, when top is open, as shown. The rollers L L are provided with outside thumb-buttons N for effecting the change of figure-pictures, such as could be produced to represent human beings or animals, the skeletons being on the reverse side of the screen and the more prominently printed, so that it appears through the general figure, which becomes less discernible to view when the back opening of the box is clear of the flap or shutter and the top opening C closed.

What I claim, and desire to secure by Letters Patent, is—

An optical toy comprising a camera-like box, a transparent card therein having on one side an ordinary figure-object and on the opposite side a corresponding skeleton, said box having an eyepiece and two openings, one of which allows the cards to be seen by reflected light, and the other of which allows the card to be seen by transmitted light, and a shutter to close the first-named opening at will.

In witness whereof I have hereto signed my name, in the presence of two subscribing witnesses, this 31st day of March, 1896.

JOHN THOMAS LAWRENCE.

Witnesses:
 RICHARD CORE GARDNER,
 CHARLES A. GROSSETETE.